3,347,630
HYDROGEN PEROXIDE DECOMPOSITION
Herman J. Baumgartner, Danville, and George C. Hood, Orinda, Calif., and Donald D. Weaver, Houston, Tex., assignors to Shell Oil Company, New York, N.Y., a corporation of Delaware
No Drawing. Filed Sept. 30, 1963, Ser. No. 312,355
9 Claims. (Cl. 23—204)

This application is a continuation-in-part of copending patent application Ser. No. 300,919, filed Aug. 8, 1963, now patent No. 3,333,419.

This invention relates to methods for improving the silver-catalyzed decomposition of hydrogen peroxide and deals with new hydrogen peroxide compositions which are more advantageous in such decomposition than the peroxides previously used.

In the decomposition of hydrogen peroxide with silver catalysts, difficulty has been encountered in the past in obtaining the desired high rates of hydrogen peroxide decomposition without high rates of loss of silver from the catalyst. In our copending patent application, Ser. No. 300,919 filed Aug. 8, 1963, we have described certain salts which we have discovered to be effective in overcoming this difficulty when they are added in sufficient amount to the hydrogen peroxide being decomposed. The present patent application is directed to hydrogen peroxide solutions containing an especially effective class of additives for achieving this improved decomposition. Methods of hydrogen peroxide decomposition using these advantageous additives are other important aspects of the invention.

It has been found that the addition of one or more salts of rare earth metals to hydrogen peroxide will greatly extend the effective life of silver catalysts used to catalyze decomposition of the peroxide. The hydrogen peroxide decomposition rate is also increased significantly by these activators or promotors. The rare earth metals, whose salts are used in making the improved hydrogen peroxide solutions of the invention, are the so-called inner transition elements, particularly the lanthanides, that is, the elements having atomic numbers 57 through 71 and other elements which similarly improve the decomposition of hydrogen peroxide. Examples of such suitable elements are lanthanum, cerium, samarium, europium, gadolinium, neodymium, dysprosium, erbium, ytterbium, and the like, for instance, yttrium.

The rare earth metal salts are used in amounts which provide in the hydrogen peroxide at least 0.1 milligram of rare earth element which may be either a single such element or a mixture of two or more rare earth elements, per liter of hydrogen peroxide solution employed. This requirement sets a lower limit for the solubility of the chosen rare earth salt or salt mixture. In order to avoid poisoning of the silver catalyst surface, it is desirable to use salts which do not introduce into the hydrogen peroxide anions which form silver salts having a solubility less than 4 milligrams in 100 grams of water at 20° C. Most advantageously, rare earth metal salts of inorganic acids whose anions do not have an adverse effect upon the stability of hydrogen peroxide in storage are employed in the process. In choosing the form of the salt to be added as decomposition activator, consideration should, of course, be given to the general specifications which have been set for hydrogen peroxide intended for decomposition using silver catalysts. The military specification for hydrogen peroxide for use in reaction motors (MIL-H-16005C as modified by Supplemental Data Sheet of Apr. 10, 1962) sets these limits for components of the peroxide:

|  | Mg./l. |
|---|---|
| $PO_4$ | 0.5 max. |
| Al | 0.6 max. |
| $NO_3$ | 3.0 min.–5.0 max. |
| $SO_4$ | 3.0 max. |
| $NH_4$ | 2.6 max. |
| Sn | 4.0 max. |
| Cl | 1.0 max. |
| C | 200.0 max. |

It is on this account that phosphates, including pyrophosphates, and halides, other than the fluorides, are not desirable as anions for the promoters of the invention since these are particularly active poisons for silver decomposition catalysts. Preferred rare earth inorganic salts are the nitrates and monocarboxylic acid salts. But other inorganic salts such as the sulfate, stannate, carbonate, silicate, borate, nitrite, and the like can also be used. Acid or basic salts can be used instead of the neutral salts, for example, the bicarbonate, or bisulfate. Organic rare earth salts which can also be used include, for instance, the monocarboxylic acid salts, particularly fatty acid salts such as formates, acetates, butyrates, pivalates, and the like, and aromatic acid salts such as the benzoates toluates, etc. Examples of sulfur-containing acids whose rare earth salts can be used are methyl sulfuric acid, ethyl sulfuric acid, etc. Rare earth salts or substituted organic acids can be used as well as the foregoing unsubstituted acids. Thus, salts of halogenated acids which do not poison the silver catalyst can be used, although salts of acids which have 85% or more of their hydrogen atoms replaced by halogen are not employed. Other suitable substituted acids whose salts can be used are, for example, hydroxy acids such as lactic acid, and the like. One can also use successfully rare earth salts of polycarboxylic acids whose silver salts have a solubility preferably greater than 5 milligrams per liter.

The chosen salt mixture should be used in an amount which will introduce into the hydrogen peroxide which is to be decomposed at least about 0.1 milligram of rare earth or like metal per liter of the hydrogen peroxide. Advantageously, amounts which will provide about 0.1 to about 10 milligrams of the metal per liter of peroxide are employed. Larger amounts can be added, but they give no advantage. Most advantageously, the rare earth salt is used in amounts equivalent to the addition of about 0.2 to about 3 milligrams of the metal per liter of hydrogen peroxide being decomposed.

The hydrogen peroxide can contain other components which do not interfere with the desired catalytic decomposition. These include stabilizers for the hydrogen peroxide, many of which are in use. Preferably sodium stannate or the like is used as stabilizer, but organic stabilizers such, for example, as ethylenediamine tetra acetic acid, preferably in its partial salt form, or other such known stabilizers can be used together with the rare earth metal salt activators.

There are special advantages in using the rare earth metal salts chosen as additives for the hydrogen peroxide in combination with certain special other additives which also have a beneficial effect upon the catalytic decomposition of the peroxide by silver or like catalysts. Particularly desirable among these other additives are the salts of nickel and/or cadmium, and/or zinc. It has been found that combinations of these salts with yttrium or rare earth salts markedly improve the hydrogen peroxide decomposition. Remarkable synergistic effects in improving the catalytic decomposition can be obtained with combinations of these salts which produce results that are better than the sum of those obtained when these additives are used individually. The neckel, zinc, or cadmium salt may be that of any of the anions previously described as useful with the rare earths; and its anion may be the same or different from that of the yttrium or rare earth salt with which it is employed. It is advantageously used in an amount such that the total amount of zinc, cadmium, and nickel used is in the range previously indicated as desirable for the rare earth metal content.

The hydrogen peroxide decomposed preferably has a concentration of at least 30% by weight and more advantageously is concentrated hydrogen peroxide of 80% wt. strength or higher, most preferably about 90 to 100% wt. concentration.

The metallic silver-containing catalysts used in the process of the invention include pure or substantially pure silver catalysts and alloys or mixtures of metallic silver with other metals which may or may not be themselves catalysts for hydrogen peroxide decomposition. Alloys of silver with a minor amount of other catalytic metal are particularly useful. Among the other catalytic metals which can be used with silver catalysts are, for instance, precious metals such as platinum, palladium, rhodium, iridium, osmium, and the like.

The silver catalyst or silver catalyst-containing mixture used for hydrogen peroxide decomposition according to the invention can be employed in any of the customary forms. They can, for example, be used in the forms of screens, perforated plates, or the like, which can be superimposed on each other to make a fixed bed through which the hydrogen peroxide can be passed without excessive pressure drop. United States Patent 2,865,721, for example, described suitable catalyst bed assemblies containing silver catalysts which can be used in the process of the present invention. Beds of granular or other porous forms of silver-containing decomposition catalyst can also be used.

While it is a special advantage of the process of the invention that the decomposition of the hydrogen peroxide can be initiated at low, initial temperatures, this is not essential for successful operation which can be carried out with hydrogen peroxide at any temperature and pressure at which the peroxide feed is in the liquid state. Feed temperatures of the order of about −20° to about 60° C. and operating pressures of atmospheric to about 100 atmospheres are generally suitable, but other operating conditions can also be used.

The source of the hydrogen peroxide which is decomposed is not important in the new process which can be carried out successfully with hydrogen peroxide from any source. The new method has been used with hydrogen peroxide of different kinds and can be advantageously employed with hydrogen peroxide from organic sources, such, for instance, as the oxidation of alkyl anthraquinones, or alcohols, or hydrocarbons, or hydrazobenzenes, for example, as well as with electrolytic hydrogen peroxide.

The following examples illustrate in more detail suitable methods for carrying out the new process and show some of its advantages. In these examples, the decomposition efficiencies in the various tests are reported as the number of gram moles of hydrogen peroxide which were decomposed per gram of catalyst metal lost at a standard catalyst area and length of time of operation. This is the single most significant parameter with respect to performance in practical motors, and a high efficiency of this kind characterizes the most desirable hydrogen peroxide feed for the motor. A high, specific hydrogen peroxide decomposition rate is also advantageous as previously pointed out, since it provides improved starting at low temperatures and results in reduction of the time required for starting a decomposer at a given temperature.

*Example I*

Dynamic tests were carried out which determine the rates of hydrogen peroxide decomposition and of loss of catalyst at the inlet of a hydrogen peroxide decomposer using a silver catalyst. The liquid hydrogen peroxide feed was pressured from a 347 stainless-steel tank with nitrogen through an automatic valve controlled by a Pedersen automatic feed rate balance using a flow rate of 45 grams of the hydrogen peroxide solution per minute. The feed hydrogen peroxide was heated to reaction temperature in a section of ⅛-inch stainless-steel tubing immersed in a water bath. After contacting the catalyst in the form of a pure silver rod ¼-inch long and ⅛-inch in diameter into which a thermocouple was silver soldered, the effluent was passed through a cooler, back pressure regulator, and gas-liquid separator. The average of the temperatures of the hydrogen peroxide stream measured with thermocouples just before and after the silver catalyst was 25° C. during the test which was carried out at 300 p.s.i.a. The loss of catalyst was determined by accurate weighing of the silver specimen before and after the test which was carried on for 30 minutes. With standard, commercial hydrogen peroxide of 90% wt. concentration produced via oxidation of secondary alcohol, the following results were obtained with representative rare earth nitrates as the promoters.

| Additive (in solution in the hydrogen peroxide) | Amount (milligrams of indicated component per liter of $H_2O_2$ solution) | $H_2O_2$ decomposition rate (moles $H_2O_2$ decomposed per sq. cm. catalyst surface, minute) | Decomposition efficiency (moles of $H_2O_2$ decomposed per gram of silver lost) |
|---|---|---|---|
| None | None | 0.133 | 530 |
| Lanthanum nitrate | 1.4 La | | 830 |
| Samarium nitrate | 1.0 Sm | | 2,000 |
| Do | 1.4 Sm | .171 | 2,240 |
| Europium nitrate | 1.4 Eu | .198 | 3,540 |

Good results are also obtained when equivalent amounts of cerium or praseodynium or dysprosium nitrates are dissolved in the hydrogen peroxide or when cerium, or neodymium is added in the form of the benzoate or acetate.

These results are in contrast with those obtained when beryllium or magnesium salts are used in place of the foregoing rare earth salts. The salts of these other Group II metals give essentially no improvement in the silver-catalyzed decomposition. With $Mg(NO_3)_2 \cdot 6H_{20}$, for example, in an amount equivalent to 1.4 milligrams of magnesium per liter of hydrogen peroxide, the decomposition rate, when using the same hydrogen peroxide, was 0.090 mole per sq. cm. of catalyst surface, minute; and the decomposition efficiency was 535 moles of $H_2O_2$ per gram of silver lost.

*Example II*

A test made as described in Example I using another sample of hydrogen peroxide of 90% concentration gave the following results:

| Additive dissolved in the $H_2O_2$ | Amount of additive (equivalent amount of indicated metal per liter of solution) | $H_2O_2$ decomposition rate (moles $H_2O_2$ decomposed per sq. cm. catalyst surface, minute) | Decomposition efficiency (moles of $H_2O_2$ decomposed per gram of silver lost) |
|---|---|---|---|
| None | None | 0.111 | 740 |
| Erbium nitrate | 1 mg. Er | 0.126 | 2,030 |
| Yttrium nitrate | 1 mg. Y | 0.137 | 4,000 |

Similar results are obtained in the same way when using ytterbium, gadolinium, or thulium nitrates as the promoters in equivalent amounts.

*Example III*

The effect obtained by using selected promoter salts of the invention in combination or with zinc salts is shown by the following results obtained in tests carried out using the method of Example I but with hydrogen peroxide of 90% wt. concentration which was purposely contaminated with anions which adversely affected its decomposition, the PO₄ content being 0.25 mg. per liter and aluminum, 0.11 mg. per liter.

| Additive (in solution in the hydrogen peroxide) | Amount (milligrams of indicated component per liter of H₂O₂ solution) | H₂O₂ decomposition rate (moles H₂O₂ decomposed per sq. cm. catalyst surface, minute) | Decomposition efficiency (moles of H₂O₂ decomposed per gram of silver lost) |
|---|---|---|---|
| None | None | 0.093 | 264 |
| Lanthium nitrate | 0.5 | } 0.214 | } 2,660 |
| Zinc nitrate | 1.0 | | |
| Samarium nitrate | 0.5 | } 0.190 | } 1,200 |
| Zinc nitrate | 1.0 | | |
| Europium nitrate | 0.5 | } 0.190 | } 1,470 |
| Zinc nitrate | 1.0 | | |
| Erbium nitrate | 0.5 | } 0.216 | } 1,775 |
| Zinc nitrate | 1.0 | | |
| Yttrium nitrate | 0.5 | } 0.183 | } 1,560 |
| Zinc nitrate | 1.0 | | |

We claim as our invention:

1. Hydrogen peroxide of at least 80% concentration containing a dissolved salt of a rare earth element in an amount equivalent to at least 0.1 milligram of said element per liter which is effective in reducing the loss of silver during silver-catalyzed decomposition of said hydrogen peroxide.

2. Hydrogen peroxide in accordance with claim 1 wherein a rare earth nitrate is dissolved in the hydrogen peroxide in an amount equivalent to between about 0.1 and about 10 milligrams of rare earth element per liter of solution.

3. Hydrogen peroxide containing dissolved therein an amount of rare earth salt of a monocarboxylic acid which does not poison silver catalysts for hydrogen peroxide decomposition, the amount of said salt being such as will provide about 0.1 to about 10 milligrams of rare earth element per liter of hydrogen peroxide solution.

4. Hydrogen peroxide having dissolved therein a rare earth salt of a lower fatty acid in an amount sufficient to provide about 0.2 to about 3 milligrams of rare earth element per liter of solution.

5. Hydrogen peroxide containing dissolved therein an amount of samarium salt whose anion does not introduce into the solution a member of the group consisting of phosphorous-containing ions and ions of halogens having atomic numbers greater than nine, the amount of said salt being such as will provide about 0.1 to about 10 milligrams of samarium per liter of hydrogen peroxide solution.

6. Hydrogen peroxide containing dissolved therein an amount of europium salt whose anion does not introduce into the solution a member of the group consisting of phosphorous-containing ions and ions of halogens having atomic numbers greater than nine, the amount of said salt being such as will provide about 0.1 to about 10 milligrams of europium per liter of hydrogen peroxide solution.

7. Hydrogen peroxide containing dissolved therein an amount of erbium salt whose anion does not introduce into the solution a member of the group consisting of phosphorous-containing ions and ions of halogens having atomic numbers greater than nine, the amount of said salt being such as will provide about 0.1 to about 10 milligrams of erbium per liter of hydrogen peroxide solution.

8. Hydrogen peroxide containing dissolved therein an amount of yttrium salt whose anion does not introduce into the solution a member of the group consisting of phosphorous-containing ions and ions of halogens having atomic numbers greater than nine, the amount of said salt being such as will provide about 0.1 to about 10 milligrams of yttrium per liter of hydrogen peroxide solution.

9. In a method of decomposing hydrogen peroxide of about 80% to 100% wt. concentration by passage through a bed of silver-containing catalyst, the improvement which comprises feeding to said bed hydrogen peroxide having dissolved therein a salt of a rare earth metal whose anion does not form a silver salt having a solubility in water at 20° C. which is less than 3 milligrams per 100 grams of water, said salt being present in an amount equivalent to about 0.1 to about 10 milligrams of rare earth metal per liter of the solution.

References Cited
UNITED STATES PATENTS

| 2,739,042 | 3/1956 | Corey et al. | 23—207 |
| 2,871,104 | 1/1959 | Rust | 23—207 |
| 3,156,089 | 11/1964 | Baumgartner et al. | 60—35.4 |
| 3,212,255 | 10/1965 | Putt et al. | 60—35.4 |

OTHER REFERENCES

Lemoine: Complt. rend. 162, p. 702–708 (1916).

MILTON WEISSMAN, *Primary Examiner.*

OSCAR R. VERTIZ, *Examiner.*

H. S. MILLER, *Assistant Examiner.*